(12) United States Patent
Graeber et al.

(10) Patent No.: US 12,188,379 B2
(45) Date of Patent: Jan. 7, 2025

(54) PRESSURE CONTROL FOR CLOSED BRAYTON CYCLES

(71) Applicant: Siemens Energy Global GmbH & Co. KG, Bayern (DE)

(72) Inventors: Carsten Graeber, Erlangen (DE); Uwe Juretzek, Erlangen (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/769,387

(22) PCT Filed: Jul. 15, 2020

(86) PCT No.: PCT/EP2020/069988
§ 371 (c)(1),
(2) Date: Apr. 15, 2022

(87) PCT Pub. No.: WO2021/089204
PCT Pub. Date: May 14, 2021

(65) Prior Publication Data
US 2024/0133321 A1    Apr. 25, 2024
US 2024/0229685 A9    Jul. 11, 2024

(30) Foreign Application Priority Data

Nov. 4, 2019    (EP) .................................. 19206843

(51) Int. Cl.
*F01K 25/00*    (2006.01)
*F01K 13/00*    (2006.01)
(Continued)

(52) U.S. Cl.
CPC .............. *F01K 25/00* (2013.01); *F01K 13/00* (2013.01); *F01K 13/02* (2013.01); *F02C 1/10* (2013.01);
(Continued)

(58) Field of Classification Search
CPC ...... F02C 9/24; F02C 1/10; F02C 6/16; F01D 15/10; F01K 25/00; F01K 13/02; F01K 13/00; F05D 2270/301; F05D 2270/3061
See application file for complete search history.

(56) References Cited

U.S. PATENT DOCUMENTS 3,512,358 A * 5/1970 Schmidt .................... F02C 1/10
                                                          60/659
5,131,231 A * 7/1992 Trimble .................... F02C 1/10
                                                          60/668
(Continued)

FOREIGN PATENT DOCUMENTS

CA    3140746 A1 * 11/2020 ........... F01K 25/103
CN    108591027 A * 9/2018 ............. F25J 1/0012
(Continued)

OTHER PUBLICATIONS

CN 108591027, English Langauge Machine Translation (Year: 2018).*
(Continued)

*Primary Examiner* — Wesley G Harris
(74) *Attorney, Agent, or Firm* — Wolter Van Dyke Davis, PLLC

(57) ABSTRACT

An apparatus includes a closed gas system having: a working circuit in which a compressor for a working fluid, a first heat exchanger for heating the working fluid, an expander and a second heat exchanger for cooling the working fluid are arranged; a first pressurised gas tank and a first gas pipe which branches off from the working circuit between the compressor and the first heat exchanger and opens into the first pressurised gas tank; and a second gas pipe which branches off from the first pressurised gas tank and opens into the working circuit between the expander and the
(Continued)

second heat exchanger. A method controls pressure in a closed gas system using the apparatus.

9 Claims, 2 Drawing Sheets

(51) Int. Cl.
    *F01K 13/02*     (2006.01)
    *F02C 1/10*     (2006.01)
    *F02C 6/16*     (2006.01)

(52) U.S. Cl.
    CPC .......... *F02C 6/16* (2013.01); *F05D 2270/301* (2013.01); *F05D 2270/3061* (2013.01)

(56) References Cited

U.S. PATENT DOCUMENTS

| | | |
|---|---|---|
| 2014/0053560 A1 | 2/2014 | Simpkin |
| 2014/0083098 A1 | 3/2014 | Davidson |
| 2014/0088773 A1 | 3/2014 | Davidson |
| 2020/0200049 A1* | 6/2020 | Ryu .................... F02B 37/12 |

FOREIGN PATENT DOCUMENTS

| | | | | |
|---|---|---|---|---|
| CN | 113738620 A | * | 12/2021 | ............. F01K 25/10 |
| DE | 2602081 A | * | 7/1977 | ................ F02C 9/24 |
| DE | 102010034231 A1 | | 2/2012 | |
| EP | 2808500 A1 | | 12/2014 | |
| EP | 3734027 A1 | | 11/2020 | |
| JP | S59206617 A | | 11/1984 | |
| JP | H0868341 A | | 3/1996 | |
| JP | H09144558 A | | 6/1997 | |
| JP | 2000154733 A | | 6/2000 | |
| JP | 2003056312 A | | 2/2003 | |
| KR | 20150084804 A | | 7/2015 | |
| KR | 101816021 B1 | | 1/2018 | |
| WO | WO-2016185906 A1 | * | 11/2016 | ............. F01D 17/08 |
| WO | WO-2016203980 A1 | * | 12/2016 | ............. F01D 17/08 |
| WO | 2018225922 A1 | | 12/2018 | |

OTHER PUBLICATIONS

DE 2602081, English Language Machine Translation (Year: 1977).*
PCT International Search Report and Written Opinion of International Searching Authority mailed Nov. 30, 2020 corresponding to PCT International Application No. PCT/EP2020/069988 filed Jul. 15, 2020.

* cited by examiner

PRESSURE CONTROL FOR CLOSED BRAYTON CYCLES

CROSS REFERENCE TO RELATED APPLICATIONS

This application is the US National Stage of International Application No. PCT/EP2020/069988 filed 15 Jul. 2020, and claims the benefit thereof. The International Application claims the benefit of European Application No. EP19206843 filed 4 Nov. 2019. All of the applications are incorporated by reference herein in their entirety.

FIELD OF INVENTION

The invention relates to an apparatus comprising a closed gas system with a working circuit, and to a method for pressure control in a closed gas system.

BACKGROUND OF INVENTION

Because of the prescribed system volume, closed gas systems are subject to temperature-induced and/or mass-flow-induced pressure fluctuations; the latter occur due to the specifically intended supply or removal of gas and also due to unavoidable gas losses as a result of system leakages. In the case of closed Brayton cycles, these pressure fluctuations or the respectively set upper/lower system pressure have definite effects on the efficiency of the process.

Processes in the form of cycles are known, for example from US 2014/053560 A1, which discloses a thermal/electrical power converter which, in addition to a gas turbine and a compressor, comprises further components, such as a power source, various heat exchangers and a reservoir tank. JP H08 68341 A discloses an apparatus for controlling the power of a gas turbine with a closed Brayton cycle. Furthermore, U.S. Pat. No. 5,131,231 A discloses a process for operating an engine with a closed cycle and also an engine suitable for use with the process.

SUMMARY OF INVENTION

An object of the invention is to provide an apparatus which makes improved part-load efficiency possible for a closed Brayton cycle. A further object of the invention is to provide a corresponding method for pressure control in such a closed gas system.

Closed Brayton cycles have special requirements for the system design, because there is no defined lower process pressure, for example as a result of the surroundings or a condensation process. This lower process pressure must therefore be set by means of a corresponding possibility of controlling the system pressure. The aim of this is to compensate for the pressure changes by changes in the process working temperatures.

The lower process pressure should be adjusted variably in dependence on the power of the cycle, in the same way as this can be regarded as standard procedure on the upper process pressure side (variable pressure operation in the case of steam and gas turbines to avoid throttling losses in part load). In addition, there are generally requirements based on commercial concerns or from the viewpoint of environmental protection for entirely avoiding as far as possible, or at least keeping down as much as possible, the gas discharge from the system into the surroundings, since the medium used in the cycle is too valuable (for example when using pure nitrogen or even helium) or possibly too environmentally harmful to allow more than only minimal losses into the surroundings to be accepted.

On the basis of these considerations, the invention achieves the object directed to an apparatus in that it provides that, in the case of such an apparatus, comprising a closed gas system with a working circuit, in which a compressor for a working fluid, a first heat exchanger for heating the working fluid, an expander (gas expansion turbine) and a second heat exchanger for cooling the working fluid are arranged, a first pressurized gas tank and a first gas line are provided, wherein the gas line branches off from the working circuit between the compressor and the first heat exchanger and opens into the first pressurized gas tank, and also furthermore a second gas line is provided, which branches off from the first pressurized gas tank and opens into the working circuit between the expander and the second heat exchanger.

The invention therefore provides a pressurized gas tank (or if more economical possibly also a number of such tanks), which is connected on the high-pressure side (i.e. downstream of the compressor of the closed Brayton cycle on the working process to a suitable gas line for filling the tank. The tank is always filled whenever it is required from the viewpoint of the process (for example, during shutting down, the system pressure is reduced in order to lower losses at a standstill). For this purpose, a partial stream is led out from the Brayton cycle. In order to discharge the stored amount of gas into the system in case of need, a further gas line downstream of the expander is incorporated into the working circuit.

In an advantageous exemplary embodiment of the invention, a third gas line branches off from the pressurized gas tank or from the second gas line and opens into the working circuit between the compressor and the first heat exchanger. This further incorporation, but now on the high-pressure side and upstream of the heating of the medium in the circuit, makes it possible for the stored pressure energy to be used during the starting-up operation.

It is advantageous if a third heat exchanger is arranged in the first gas line. With this heat exchanger, recooled for example by means of cold from the surroundings (the heat exchanged could also be stored), the gas is cooled downstream of the compression before it is advantageously expanded into the pressurized gas tank by way of a corresponding first valve in the first gas line, which is consequently arranged downstream of the third heat exchanger in the direction of flow of the working fluid. Depending on the gas that is used, this expansion results in further cooling because of the Joule-Thomson effect.

If heating takes place on the basis of the expansion because of the Joule-Thomson coefficient (which describes the strength and direction of the change in temperature) of the respective gas, expediently a first valve is arranged in the first gas line upstream of the third heat exchanger in the direction of flow of the working fluid. These measures serve for increasing the gas density, in order in this way to increase the stored amount of gas with a given tank volume.

In an advantageous exemplary embodiment of the invention, a fourth heat exchanger is arranged in the second gas line and a fifth heat exchanger is arranged in the third gas line. The second and third gas lines are feedback lines from the first pressurized gas tank into the working circuit. The fourth and fifth heat exchangers are typically heated by means of waste heat (for example from the intermediate cooling system of the power plant) and heat the gas before it enters the working circuit, i.e. heat the working circuit.

The heating of the gas reduces the cooling effect on the gas that is already in the working circuit, and the desired increase in pressure in the working circuit as a result of replenishing the gas takes place more quickly and with less mass flow.

In a further advantageous exemplary embodiment of the invention, at least one thermal store is connected by way of switchable connecting lines to the third heat exchanger, fourth heat exchanger or fifth heat exchanger. Especially in the case of power plants, which often have to change the power output significantly, it may be advantageous to provide such a thermal store which absorbs the heat of the working gas before it enters the pressurized tank and then subsequently heats it up again before the working gas is fed back into the circuit. This can be achieved by a tank operated as a regenerator, filled with a good heat-storing solid material. By correspondingly switching over connecting lines, this tank is flowed through by the heat-dissipating and absorbing gas respectively in opposite directions.

Since leakage losses are inevitable, it is advisable if working fluid can be replenished. This expediently takes place on the low-pressure side of the working circuit and upstream of the cooling, that is to say between the expander and the second heat exchanger.

It is advantageous if at least one second pressurized gas tank is connected in parallel with the first pressurized gas tank and the pressurized gas tanks can be operated at different pressure levels. The use of a number of pressurized gas tanks which store the working gas at different pressure levels in each case makes it possible to fill a comparatively small pressurized tank "HP" with high pressure when there is a high expander outlet pressure and accordingly a high compressor outlet pressure in the working circuit. The removal of this working gas from the working circuit has the effect that then the pressure in the circuit falls. The working gas removed in the further course of the process is then stored in the pressure tank "LP" at a lower pressure level. This makes it possible to optimize the overall tank size and, in particular when shutting down, to lower the pressure of the working circuit to a lowest possible positive pressure. This lowest possible positive pressure of the working circuit is desirable in order to keep down losses at a standstill due to leakage by way of the shaft seals of the compressor or expander.

In order to achieve a highest possible pressure increase or compression of the working fluid, a number of compressor stages can be connected one behind the other. It is advantageous in this context if the compressor comprises at least two compressor stages and a fifth gas line branches off from the working circuit between two compressor stages and opens into at least one of the pressurized gas tanks. In this way, the compressor power consumption or size/design of the pressurized gas tank(s) is optimized.

The object directed to a method is achieved by a method for pressure control in a closed gas system, wherein a working fluid is compressed, heated, expanded and cooled repeatedly one after the other in a working circuit. According to the invention, for controlling a pressure in the gas system, a partial stream of the working fluid is removed from the working circuit and stored, or a stored amount of working fluid is incorporated again into the working circuit, wherein the stored amount of working fluid is incorporated into the working circuit between the expansion and cooling of the working fluid in the working circuit.

The advantages of this method correspond to the aforementioned advantages as apply to the apparatus according to the invention.

Advantageously, the working fluid is removed from the closed gas system once it has been at least partially compressed and before it is heated by heat exchange.

It is also advantageous if the removed working fluid is cooled before it is stored.

It is in this case expedient if, in the case of a positive Joule-Thomson coefficient, the working fluid is first cooled by way of a heat exchange and then expanded by means of a valve into a pressurized gas tank and, in the case of a negative Joule-Thomson coefficient, the working fluid is first expanded by way of the valve and then possibly cooled by way of a heat exchange and then stored.

It is also expedient if the working fluid is heated before it is incorporated again into the working circuit.

Advantageously, a thermal store is charged during the cooling of the working fluid and discharged during the heating of the working fluid.

Finally, it is advantageous if working fluid removed from the working circuit at different pressures is fed to different pressurized gas tanks.

The concept according to the invention of gas-pressure maintaining and gas-pressure control for closed circuits can be advantageously used in a wide variety of closed Brayton-cycle-based power-plant processes, for example also within an LNG regasification power plant (LNG: short for "liquefied natural gas"). This involves, inter alia, that the loss of valuable gas used in the cycle (in the case of the LNG regasification power plant: water- and $CO_2$-free nitrogen) is minimized and at the same time throttling losses in the working circuit in part load, etc. are avoided. The gas used in the cycle is in this case stored in a limited tank volume at comparatively low/moderate temperature (i.e. great mass in the case of a given volume—either because the gas used in the cycle already leaves the compressor at a comparatively low temperature such as in the case of the LNG regasification power plant and/or because it has been additionally cooled before entering the pressurized tank). As a result of the moderate temperatures, comparatively inexpensive material can also be used for the system.

With the proposed concept, in the first step the pressure maintenance in the system is ensured. Furthermore, a low-cost solution can be provided by the link-up on the high-pressure side of the compressor already present in the Brayton cycle (i.e. this compressor does not have to be additionally provided). With regard to the costs, the container configuration also benefits from the high pressure. In the case of a defined compensating amount, high pressure means a correspondingly reduced volume, and associated with that a reduced tank size. By choosing a pressure to correspond to an interim removal from the compressor, in addition the pressure that is most favorable from a commercial viewpoint can always be chosen (in the case where the tank wall thickness, increasing with the pressure, or the material to be chosen outweighs the lowering of the cost due to the reduction in the tank volume). The high pressure in the tank also makes a rapid reaction time of the pressure control possible by way of the link-up with the working circuit. This allows the speed of pressure control for variable pressure operation on the lower process pressure to be synchronized with the speed of pressure change on the upper process pressure. The variable pressure operation of the system (lower process pressure+upper process pressure) gives reason to expect a maximum efficiency of the cycle, since the determining working machines (compressor, expander) manage without any major control interventions (i.e. completely open control valves or guide stages) and the determining average process temperatures also at the same time vary in the same relationship. If a feed-in line is provided upstream of the expander, there is a further advantage of the solution in that the stored pressure energy can also at the same time be used during the starting up of the process. The corresponding volume changing work in the expander makes possible the direct (the expander drives the compressor at the common shaft) or indirect (the generator at the expander provides the energy for the motor at the compressor) "activation" of the compressor in the working circuit.

Uncontrolled mass-flow-induced pressure changes (for example because of gas leakages at the working machines) are compensated by feeding an additional gas downstream of the expander. This has the advantage that the replenishment takes place at comparatively low pressure, and consequently the corresponding expenditure for a corresponding separate compressor, etc. is limited. Apart from the closed Joule power-plant processes, which have been hitherto discussed as an application, the concept is also very well suited for controlling heat pumps (which use a gas as a working medium without a phase change and in addition to the customary compressor also have an expander) in part load. Here, too, the advantage is that there is no need for throttling elements and their associated losses.

BRIEF DESCRIPTION OF THE DRAWINGS

The invention is explained in more detail by way of example on the basis of the drawings, in which schematically and not to scale.

DETAILED DESCRIPTION OF INVENTION

Figure 1:
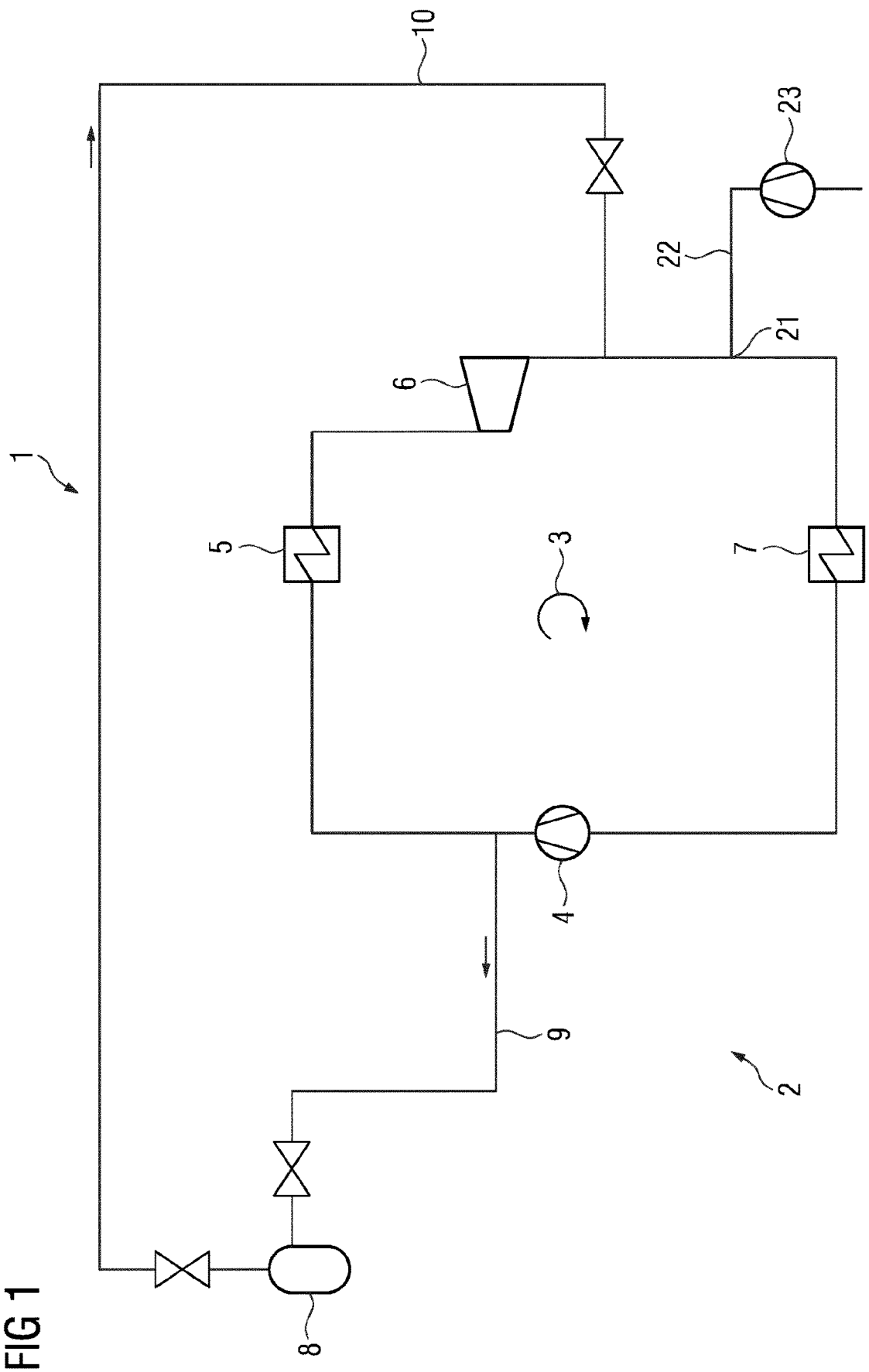
FIG. 1 shows the basic concept for a closed gas system with pressure control according to the invention and FIG. 2 shows a closed gas system with various developments of the basic concept of FIG. 1.

FIG. 1 shows schematically and by way of example an apparatus 1 comprising a closed gas system 2 with a working circuit 3, in which a compressor 4 for a working fluid, a first heat exchanger 5 for heating the working fluid, an expander 6 (gas expansion turbine) and a second heat exchanger 7 for cooling the working fluid are arranged.

In the exemplary embodiment of FIG. 1, a first gas line 9 branches off from the working circuit 3 between the compressor 4 and the first heat exchanger 5 and opens into the first pressurized gas tank 8. Furthermore, a second gas line 10 branches off from the first pressurized gas tank 8 and opens into the working circuit 3 between the expander 6 and the second heat exchanger 7.

Since leakages are inevitable, the working fluid can be replenished between the expander 6 and the second heat exchanger 7. The replenishment with the replenishing point 21, the replenishing line 22 and the replenishing pump 23 is used to compensate for the normal loss of gas in the system.

Figure 2:
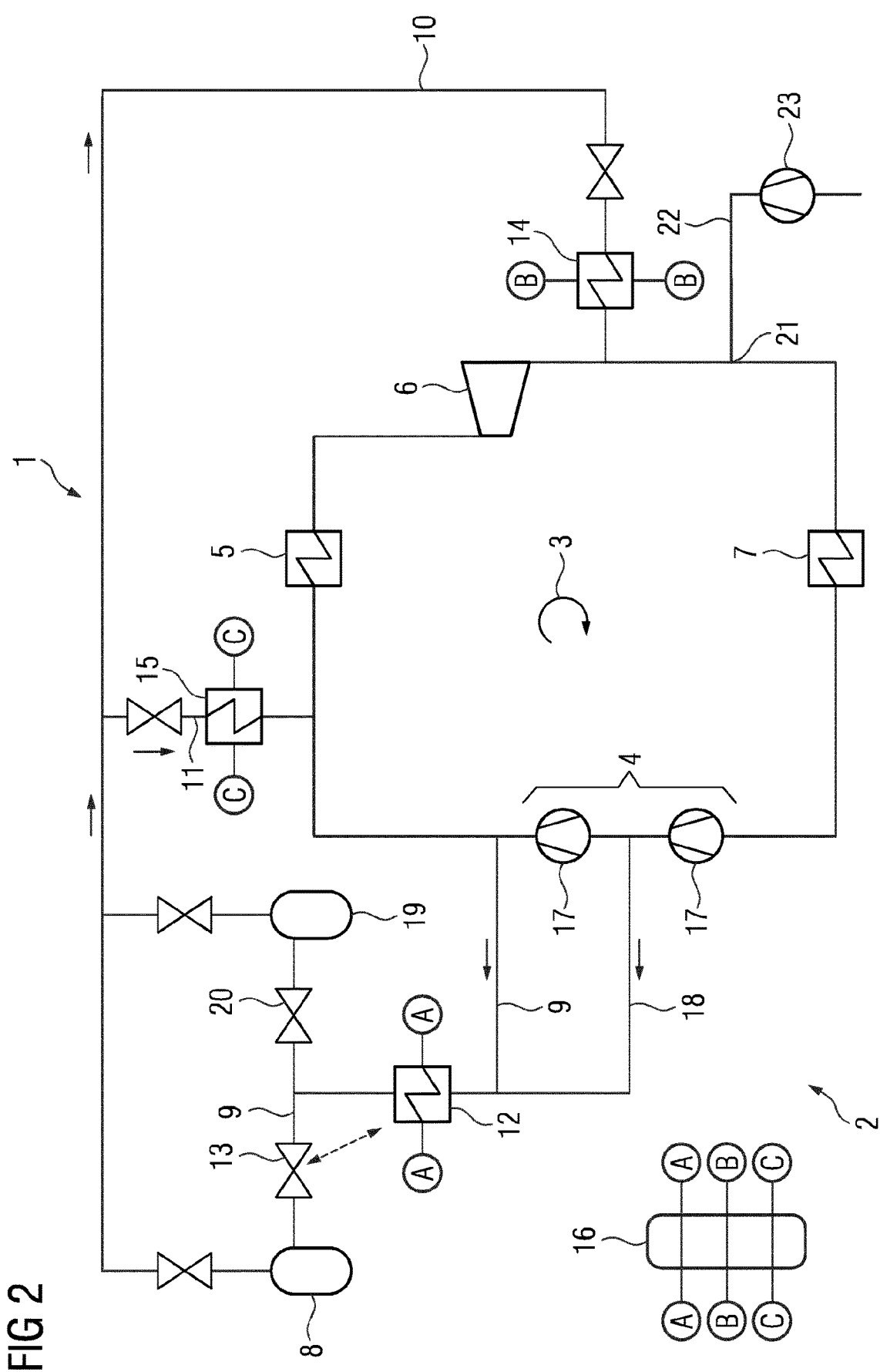

FIG. 2 shows some extensions of the basic concept shown in FIG. 1, which can be used either on their own or in combination. For example, a third gas line 11 branches off from the first pressurized gas tank 8 or from the second gas line 10 and opens into the working circuit 3 between the compressor 4 and the first heat exchanger 5.

Furthermore, the exemplary embodiment of FIG. 2 shows three further heat exchangers. A third heat exchanger 12, arranged in the first gas line 9, cools the gaseous working fluid, whereas a fourth heat exchanger 14 in the second gas line 10 and a fifth heat exchanger 15 in the third gas line 11 serve for heating the working fluid.

With respect to the storing of the working fluid in the first pressurized gas tank 8, FIG. 2 shows a first valve 13 in the first gas line 9, which is arranged downstream of the third heat exchanger 12 in the direction of flow of the working fluid. This is the relative arrangement of the two components for the case where the working fluid cools down during the expansion. If the working fluid heats up during the expansion, the arrangement of the valve 13 and the third heat exchanger 12 is changed over. This is indicated in FIG. 2 by a dashed double-headed arrow.

In addition to the first pressurized gas tank 8 already known from FIG. 1, the exemplary embodiment of FIG. 2 has a second pressurized gas tank 19, which is connected in parallel with the first pressurized gas tank 8. A corresponding second valve 20 is also shown in FIG. 2. Typically, the pressurized gas tanks 8, 19 can be operated at different pressure levels.

Although the presence of two compressor stages 17 at the compressor 4 is not absolutely necessary for the storing of the working fluid at different pressures (it can be imagined that, after a first removal of fluid from the store into the first pressurized gas tank 8, the system pressure has fallen and consequently a second removal of fluid from the store into the second pressurized gas tank 19 takes place at a lower pressure), it does make optimizations easier. This is supplemented by a fifth gas line 18, which branches off from the circuit 3 between two compressor stages 17 and opens into at least one of the pressurized gas tanks 8, 19.

An advisable addition to the concept presented is the installation of a thermal store 16, which is connected by way of switchable connecting lines A, B, C to the third heat exchanger 12, fourth heat exchanger 14 or fifth heat exchanger 15.

The invention claimed is:

1. An apparatus, comprising:
    a closed gas system with a working circuit, in which a compressor for a working fluid, a first heat exchanger for heating the working fluid, an expander and a second heat exchanger for cooling the working fluid are arranged,
    a first pressurized gas tank and a first gas line, which branches off from the working circuit downstream of the compressor and upstream of the first heat exchanger and opens into the first pressurized gas tank, and a second gas line, which branches off from the first pressurized gas tank and opens into the working circuit downstream of the expander and upstream of the second heat exchanger,
    a third gas line which branches off from the first pressurized gas tank or from the second gas line and opens into the working circuit downstream of the compressor and upstream of the first heat exchanger;
    a third heat exchanger which is arranged in the first gas line; and
    a fourth heat exchanger which is arranged in the second gas line and a fifth heat exchanger which is arranged in the third gas line.

2. The apparatus as claimed in claim 1, further comprising:
    a first valve which is arranged in the first gas line downstream of the third heat exchanger in a direction of flow of the working fluid.

3. The apparatus as claimed in claim 1, further comprising:
    a first valve which is arranged in the first gas line upstream of the third heat exchanger in a direction of flow of the working fluid.

4. The apparatus as claimed in claim 1, further comprising:
at least one thermal store which is connected by switchable connecting lines to the third heat exchanger, the fourth heat exchanger or the fifth heat exchanger.

5. The apparatus as claimed in claim 1,
wherein the working fluid is replenished between the expander and the second heat exchanger.

6. The apparatus as claimed in claim 1, further comprising:
at least one second pressurized gas tank which is connected in parallel with the first pressurized gas tank and the first and the at least one second pressurized gas tanks are operable at different pressure levels.

7. The apparatus as claimed in claim 6,
wherein the compressor comprises at least two compressor stages and a fifth gas line branches off from the working circuit between the at least two compressor stages and opens into at least one of the first and the at least one second pressurized gas tanks.

8. An apparatus, comprising:
a closed gas system with a working circuit, in which a compressor for a working fluid, a first heat exchanger for heating the working fluid, an expander and a second heat exchanger for cooling the working fluid are arranged,
a first pressurized gas tank and a first gas line, which branches off from the working circuit downstream of the compressor and upstream of the first heat exchanger and opens into the first pressurized gas tank, and a second gas line, which branches off from the first pressurized gas tank and opens into the working circuit downstream of the expander and upstream of the second heat exchanger,
a third gas line which branches off from the first pressurized gas tank or from the second gas line and opens into the working circuit downstream of the compressor and upstream of the first heat exchanger; and
at least one second pressurized gas tank which is connected in parallel with the first pressurized gas tank and the first and the at least one second pressurized gas tanks are operable at different pressure levels;
wherein the compressor comprises at least two compressor stages and a fifth gas line branches off from the working circuit between the at least two compressor stages and opens into at least one of the first and the at least one second pressurized gas tanks.

9. An apparatus, comprising:
a closed gas system with a working circuit, in which a compressor for a working fluid, a first heat exchanger for heating the working fluid, an expander and a second heat exchanger for cooling the working fluid are arranged;
a first pressurized gas tank and a first gas line, which branches off from the working circuit downstream of the compressor and upstream of the first heat exchanger and opens into the first pressurized gas tank, and a second gas line, which branches off from the first pressurized gas tank and opens into the working circuit downstream of the expander and upstream of the second heat exchanger; and
a fourth heat exchanger which is arranged in the second gas line.

* * * * *